Figure 1:
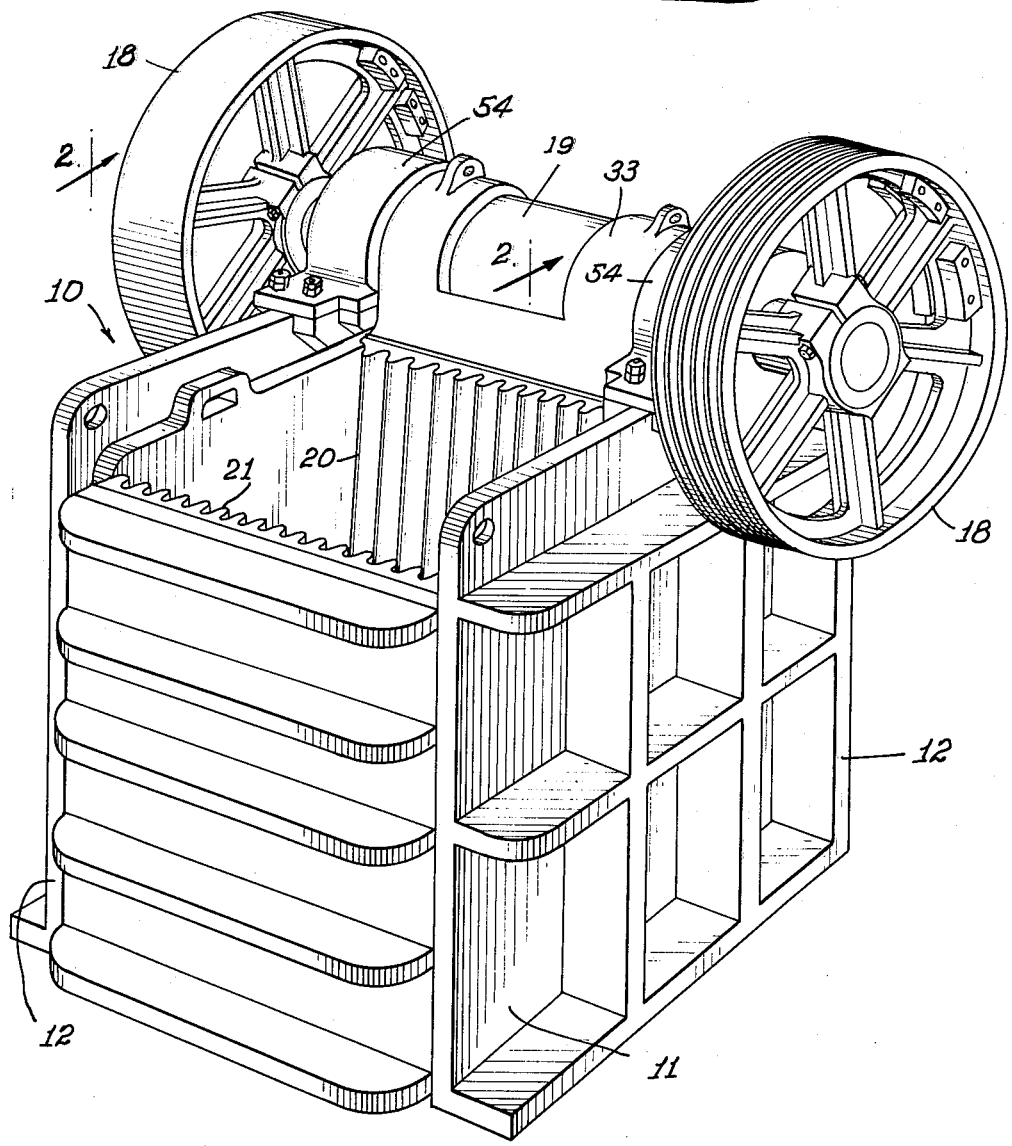

INVENTOR.
Harold C. Pollitz

Oct. 30, 1962 H. C. POLLITZ 3,061,317
SHAFT FLEXURE ACCOMMODATING DEVICE
Filed Nov. 14, 1960 2 Sheets-Sheet 2

INVENTOR.
Harold C. Pollitz
BY
Naun E. Summers atty.

United States Patent Office 3,061,317
Patented Oct. 30, 1962

3,061,317
SHAFT FLEXURE ACCOMMODATING DEVICE
Harold C. Pollitz, Cedar Rapids, Iowa, assignor to Iowa Manufacturing Company, Cedar Rapids, Iowa
Filed Nov. 14, 1960, Ser. No. 69,155
4 Claims. (Cl. 277—32)

The present invention pertains to a means of accommodating flexure of a shaft, and particularly to the accommodation of flexure of the drive shaft of a jaw crusher.

Jaw crushers, either of the single or twin jaw type, are well known, being described, for instance, in U.S. Patents No. 1,254,192 to Bartley, No. 1,309,807 to Newhouse, and No. 2,352,970 to Pollitz. All essentially comprise at least one movable jaw operated by an eccentric boss on an overhead drive shaft to achieve a crushing action relative to a stationary or a second movable jaw. Customarily, the eccentric boss is located between the shaft journals mounted atop opposite walls of the crusher base so that the eccentric spans the open interior thereof. The jaw itself is attached to a pitman in turn journaled at its upper end on the eccentric. Obviously, during the crushing operation, enormous pressures are exerted on the eccentric, which inevitably cause flexure thereof relative to the journals at each end of the shaft. In order to minimize the effect of such flexure the shaft and pitman bearings adjacent each end of the shaft are placed with the least possible distance between their centers. Nevertheless, shaft flexure is still transmittable by each pitman bearing to its adjacent shaft bearing through the lubricant seals necessarily interposed therebetween. This is especially the case when caged bearings of the roller or spherical type are used, inasmuch as, owing to their substantial diameter, a portion of the entire cage of each pitman bearing pivots to a substantial extent toward its adjacent shaft bearing during crushing operation, thus pinching the lubricant seals between the respective bearing races. If, as is usually the case, rigid seals, especially those of the labyrinth type, are or must be used, the flexure is transmitted thereby from one bearing to the other with consequent impairment of the life of both. Spacing the bearings apart so that their seals are not adjacent is unacceptable inasmuch as thereby shaft flexure would be increased for a given force applied to the shaft by the pitman.

To prevent transmission of shaft flexure in the above circumstances, the present invention provides one of the seals, generally that mounted on the shaft journal itself, with a pair of axially spaced annular grooves, one extending radially outwards and the other radially inwards, both grooves overlapping over a portion of the depth of each. The location and extent of the grooves renders the otherwise rigid seal resilient so that a portion thereof can flex without disturbing the remainder. The resiliency thereby achieved is not only in a strictly axial direction, but also so that one end face of the seal can tilt relative to the other end face which normally is parallel thereto. Thus, in a crusher, for instance, rigid, contiguous lubricant seals, whether or not of the labyrinth type, can be used between adjacent pitman and shaft bearings without adverse effect. In addition, or alternately, a resilient washer may be interposed between the adjacent seal members in order to absorb lesser flexures which the seal members themselves are not required to accommodate.

Accordingly, the primary object of the present invention is the provision of means to prevent transmission of shaft flexure between two rigid, axially fixed members on a shaft either contiguous with each other or rigidly interconnected.

A further object of the present invention is to provide an otherwise rigid, annular shaft flexure accommodating device having axially spaced grooves extending therein in opposite radial direction and overlapping each other.

Another object of the present invention is the provision of a two piece labyrinth seal for adjacent bearings of the caged type on the drive shaft of a jaw crusher, one of the pieces employing a pair of axially spaced grooves therein extending in opposite radial direction and overlapping each other.

An additional object of the present invention is to provide a resilient shaft flexure accommodating washer between adjacent, rigid lubricant seals for bearings of the caged type on the drive shaft of a jaw crusher.

Figure 2:
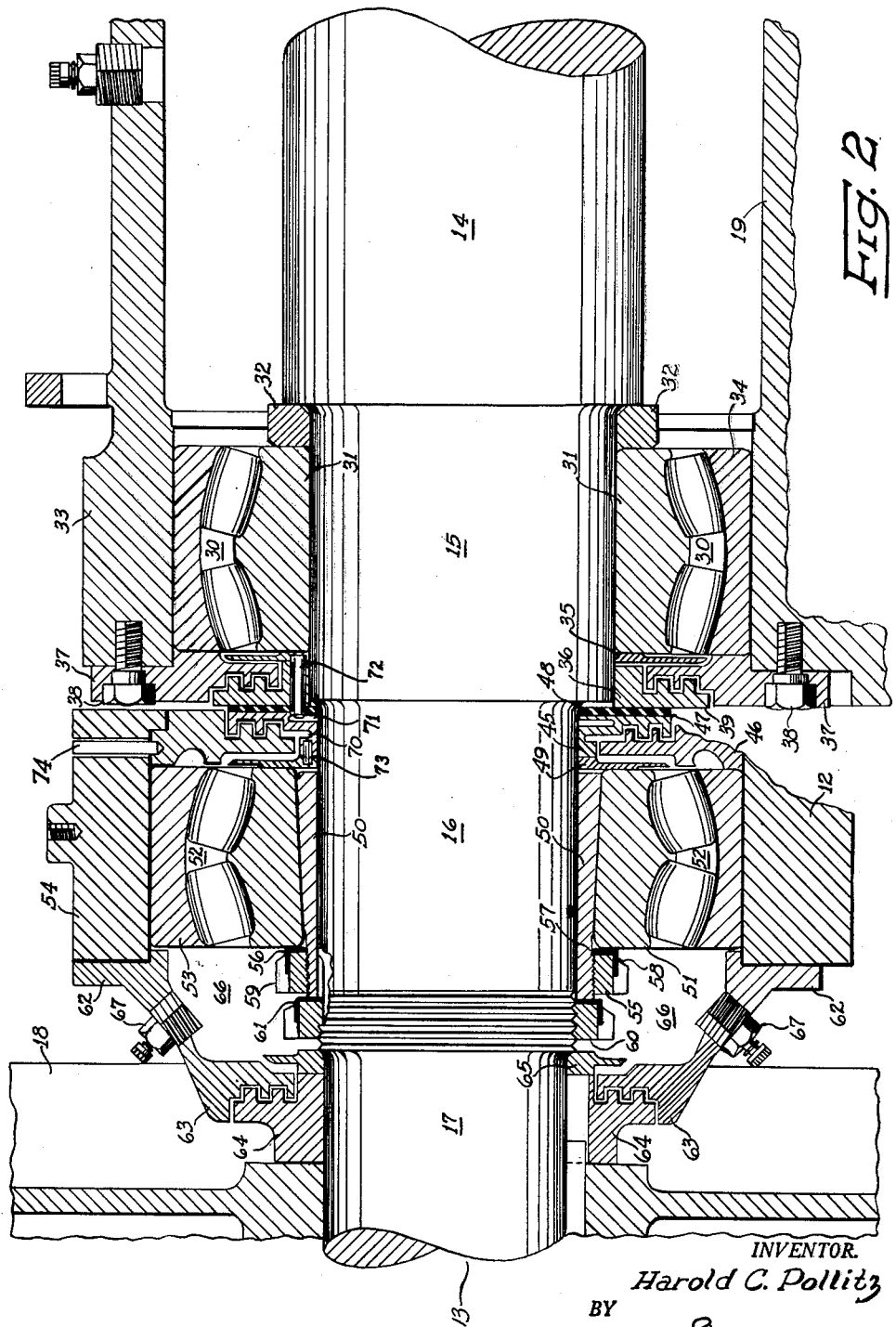

Other and further objects, features and advantages of the present invention will be apparent from the preferred form of the invention which follows, read in conjunction with the drawings in which:

FIGURE 1 is a perspective view of a typical eccentrically operated single jaw crusher; and FIGURE 2 is a section taken along the lines 2—2 of FIGURE 1 showing the present invention incorporated in the shaft assembly of the crusher, the shaft itself, for the purposes of clarity, not being shown in section.

In order to facilitate understanding of the invention, reference is made to the form thereof shown in the accompanying drawings and detailed descriptive language is employed. It will, nevertheless, be understood that no limitation of the invention is thereby intended and that various changes and alterations are contemplated such as would ordinarily occur to one skilled in the art to which the invention relates.

Referring now to the drawings, 10 designates a crusher of the single jaw type having a base 11 and side walls 12 atop which is mounted an overhead drive shaft 13. The intermediate portion of the latter is formed to provide a pitman eccentric boss 14, each end of which is stepped down to furnish pitman journals 15 concentric with boss 14. Outboard of journals 15, shaft 13 is again stepped down to provide shaft journals 16, spaced to be received atop side walls 12, and again to provide flywheel journals 17 extending beyond side walls 12 to which flywheels 18 are secured to revolve therewith. The upper end of pitman 19 is mounted on boss 14 so that during rotation of shaft 13 pitman jaw 20 cooperates appropriately with stationary jaw 21. Inasmuch as the present invention is concerned with details of the assemblies mounting pitman 19 to boss 14 and shaft 13 to side walls 12, no further discussion of crusher 10 generally or its operation is deemed necessary, all being well known in the art.

Turning then to the details of the assemblies on shaft 13, while only one-half the latter is actually shown in FIGURE 2, it will be understood that the other half is identical therewith. Pitman 19 is journaled on eccentric boss 14 by a pair of spherical, self-aligning bearings 30 whose inner races 31 on journals 15 are outwardly of and bear against shoulder rings 32 on the latter. A suitable cap 33 secures the upper end of pitman 19 to the outer races 34 of bearings 30. The widths of journals 15 are formed to be just sufficient, after the assembly of rings 32 and bearings 30 thereon, to receive slinger rings 35 and a pair of labyrinth seal assemblies comprising inner and outer annular members 36 and 37, respectively. Slingers 35 and seal members 36 and 37 cooperate in the usual manner to form a controlled lubricant path from the interiors of bearings 30, over slingers 35 and out through the labyrinth provided between members 36 and 37, the latter being fitted to the end faces of outer races 34 and cap 33 and secured by cap screws 38 or similar means. Inner seal members 36 in turn are fixed on journals 15 and terminate in outer faces 39 which project axially beyond the corresponding outer faces of seal members 37.

Similar labyrinth seal assemblies, comprising inner and outer annular members 45 and 46, respectively, are mounted on journals 16 at the shoulders between the latter and journals 15. Inner members 45 are of lesser over-all diameter than the corresponding inner members 36 and are provided with outer faces 47 between which may be interposed annular washers 48 of a suitable resilient material. Slinger rings 49 are next positioned on journals 16 followed by adapter sleeves 50 bearing thereagainst. Sleeves 50 have an outer taper toward the ends of shaft 13 and are encompassed by inner races 51, provided with inner complementary tapers, of a pair of spherical, self-aligning shaft bearings 52. Seal members 45 and 46 and slingers 49 are likewise arranged to provide controlled lubricant escape paths from the interiors of bearings 52. The outer races 53 of the latter are received atop side walls 12 and secured thereto by bearing housings 54 into whose inner ends are joined lubricant-tight outer seal members 46. The axial faces of housings 54 and seal members 46 opposite the axial faces of seal members 36 and 37 are spaced therefrom in order to provide for the escape of lubricant through each seal from bearings 30 and 52.

The axial widths of journals 16 and sleeve 50 are each sufficient, after the mounting of the foregoing assemblies thereon, to leave exposed the outer ends of each which are in turn provided with external threads. The latter on sleeves 50 engage the inner threads of lock nuts 55 turned up thereon against inner races 51 and secured by lock washers 56 interposed therebetween and keyed at 57 to sleeves 50, with tongues 58 thereof engaging serrations 59 about the periphery of lock nuts 55. The threads of journals 16 likewise engage lock nuts 60 turned up against sleeves 50 and secured in a like manner by similar lock washers 61 interposed therebetween. It will readily be seen that suitable adjustment of lock nuts 55 and 60 will provide appropriate end clearances for bearings 52, and in addition, lock nuts 60 secure all the assemblies on journals 15 and 16 tight against shoulder rings 32. Finally, the outer ends of journals 16 are closed by end caps 62, fitted lubricant tight at their inner ends to the outer ends of bearing housings 54, and extending outwardly to encompass in spaced relation the outer ends of journals 16 and the assemblies thereon. The outer ends 63 of caps 62, in turn, are formed to provide the outer portions of additional labyrinth seal assemblies whose inner members 64 are fixed on the inner ends of journals 17 to cooperate with slingers 65 also fixed thereon between inner seal members 64 and the adjacent shoulders of journals 16. Caps 62 and their adjacent structure thus form lubricant reservoirs 66 for bearings 52, access to which is provided through plugs 67 tapped into caps 62.

Returning now to inner seal members 45, a pair of concentric, axially spaced slots or grooves 70 and 71 are provided therein at their axial mid-portions. Grooves 70 extend radially inwards from the labyrinths between seal members 45 and 46 and grooves 71 extend radially outwards between grooves 70 and faces 47, from the inner periphery of members 45. Each pair of grooves 70 and 71 have sufficient depth so that they overlap to a substantial extent. Two sets of pins 72 and 73, the former extending in an axial direction from grooves 71 through the remainder of seal members 45, washers 48, seal members 36 and slingers 35 and the latter in the opposite axial direction from grooves 70 through members 45 and slingers 49, are provided in order to prevent any movement of seal members 36 and 45 and slingers 35 and 49 relative to each other. An additional set of pins 74 similarly secure seal members 46 to housings 54.

It will be seen that during operation of crusher 10, washers 48 will absorb minor flexures of shaft 13 without transmission thereof through the adjacent seal assemblies to bearings 52. Larger flexures of shaft 13 will be transmitted through washers 48 to inner seal members 45. However, grooves 70 and 71 in the latter will permit the portions of inner members 45 inboard of grooves 70 to flex relative to the remainders of members 45 abutting slingers 49, whereby bearings 52 will remain undisturbed. The amount of flexure that can be accommodated by members 45 is, of course, dependent upon the sum of the widths of grooves 70 and 71, relative to the over-all width of inner seal members 45, which can be varied to suit the circumstances. Washers 48, it should be noted, are not essential to the construction, being inserted between inner members 36 and 45 mainly for the purpose of prolonging the life of the former by requiring them to absorb only the more severe flexures of shaft 13. The crusher is perfectly operable with washers 48 omitted and the opposing faces 39 and 47 of members 37 and 46, respectively, contiguous with each other. Indeed, if the flexures of shaft 13 are not severe, grooves 70 and 71 may be unnecessary and instead washers 48 alone may be sufficient. The strength of the crusher and shaft 13 relative to the operating loads imposed thereon will determine whether washers 48 alone or together with grooves 70 and 71 are required.

It will, of course, also be apparent that the present invention is applicable to other forms of rigid, axially fixed seals between adjacent bearings on a shaft or to any structure in which shaft flexure must be accommodated by an otherwise rigid, axially fixed member.

I claim:
1. A flexure absorbing assembly for a shaft comprising a pair of otherwise rigid annular members mountable on said shaft and securable against axial movement thereon, said members being associable so that shaft flexure is transmissable from one to the other, a pair of annular axially spaced concentric grooves in one of said members, said grooves extending in opposite radial directions from the peripheries of said member with at least a portion of the depth of one of said grooves overlapping at least a portion of the depth of the other of said grooves.

2. A shaft flexure accommodating assembly comprising a shaft, a pair of otherwise rigid annular members mounted on said shaft and secured against axial movement thereon, both of said members having opposed axially transverse faces between which shaft flexure is conveyed and one of said members having therein a pair of axially spaced concentric grooves, one of said grooves extending radially outwards from the shaft receiving periphery and the other extending radially inwards from an outer periphery of said member, at least a portion of the depth of one of said grooves overlapping at least a portion of the depth of the other of said grooves.

3. The device of claim 2 wherein an axially yieldable annular washer on said shaft is interposed between said faces and contiguous therewith.

4. A shaft flexure accommodating assembly comprising a shaft, an otherwise rigid annular member mounted on said shaft and secured against axial movement thereon, means associated with said shaft through which shaft flexure is transmissable to an axially extending portion of said member, a pair of concentric grooves in the remaining axial portion of said member and spaced axially from each other, one of said grooves extending radially inwards from an outer periphery and the other extending radially outwards from an inner periphery of said member, at least a portion of the depth of one of said grooves overlapping at least a portion of the depth of the other of said grooves.

References Cited in the file of this patent

UNITED STATES PATENTS

| | | |
|---|---|---|
| 1,386,865 | Heisler | Aug. 9, 1921 |
| 1,774,159 | Schmidt | Aug. 26, 1930 |